United States Patent [19]

Schmelzer

[11] 4,409,366
[45] Oct. 11, 1983

[54] HOMOGENEOUS BLENDS OF A TRANS-ISOMER OF POLYISOPRENE

[76] Inventor: Henry Schmelzer, 66 Wingra Ave., Rutherford, N.J. 07070

[21] Appl. No.: 369,615

[22] Filed: Apr. 19, 1982

Related U.S. Application Data

[63] Continuation of Ser. No. 196,735, Oct. 14, 1980, abandoned, which is a continuation of Ser. No. 107,375, Dec. 26, 1979, abandoned.

[51] Int. Cl.³ .......................... C08L 7/00; C08L 33/02
[52] U.S. Cl. ................................ 525/221; 273/235 R; 525/196; 525/197
[58] Field of Search .................... 273/235 R; 525/197, 525/266, 221, 201, 196

[56] References Cited

U.S. PATENT DOCUMENTS 3,264,292  8/1966  Rees ..................................... 521/143
3,502,747  3/1970  Fischer et al. .
3,701,702 10/1972  Schichman et al. ................. 156/244
3,819,768  6/1974  Molitor ............................ 273/235 R
3,838,098  9/1974  Kent .
3,965,055  6/1976  Shichman et al. .................. 525/197
4,141,559  2/1979  Melvin et al. .................... 273/235 R
4,169,579 10/1979  Fujio et al. ...................... 273/235 R

FOREIGN PATENT DOCUMENTS 674595 11/1963  Canada .
727493  2/1966  Canada ............................ 273/235 R Primary Examiner—Allan Lieberman
Attorney, Agent, or Firm—Barry G. Magidoff

[57] ABSTRACT

A homogeneous stable blend comprising a trans-isomer of polyisoprene and an ionomer is formed. The blend is prepared by mixing under shear, and at a temperature in the range of from about 200°–300° F., a trans-isomer of, e.g., natural rubber and an olefinic ionomer.

14 Claims, No Drawings

HOMOGENEOUS BLENDS OF A TRANS-ISOMER OF POLYISOPRENE

This is a continuation of application Ser. No. 196,735, filed Oct. 14, 1980 which is a continuation in part of co-pending Application Ser. No. 107,375, filed on Dec. 26, 1979, both now abandoned.

This invention is directed to the blending of ionomer polymers and natural rubber, especially the ethylene-based ionomer polymers and trans-isomers of natural rubber.

The highest quality, professional grade, golf balls are covered with a relatively tough, but rubbery, material known as balata or gutta-percha. Balata is the trans-isomer of the more commonly utilized cis-polyisoprene, i.e., natural rubber. Such quality balls are commonly used by tournament-level golfers, such as those taking part in the Professional Golfers Association (PGA) tours. These high quality balls are noted for their accuracy and the distance covered by the initial drive, and especially the ease of applying 'back spin' to the ball. However, although balata is a relatively tough material, it is also known that a balata cover can be badly cut by an improperly struck ball, especially when using a metal club, or "iron".

The recreational golfer, although envying the quality of the balls used by the tournament-level professional, is generally unable to utilize the balata ball because of the expense involved in replacing the easily cut ball. Accordingly, the golf ball industry has replaced the balata cover on its recreational balls with an even tougher synthetic polymer, especially the thermoplastic ionomer polymer commonly sold under the trademark SURLYN, by DuPont. SURLYN-covered golf balls have the reputation of being practically indestructible, the extremely hard surface is not even readily damaged by badly aimed "chip" shots. The SURLYN cover does not, however, enhance the flight of a ball to the same degree, and is not conducive to the application of "back spin". This results in shorter, less accurate drives, even if the recreational golfer is able to hit the ball squarely and strongly. The application of back-spin permits accurate aiming of the ball, limiting the tendency to roll, and thus overshoot the target, upon landing.

It is known that balata, or the trans-isomer of polyisoprene, is crystalline at room temperature, resulting in a greater degree of hardness without vulcanization. This is generally referred to as "green strength".

The art has long sought to realize the golfer's dream of a golf ball cover combining the durability of the SURLYN cover with the distance and back-spin capability of the balata cover. Workers in the art have tried many ways to improve the durability of balata on one hand and the functional efficiency of the ionomer polymer on the other hand. Attempts at modifying and replacing these two materials, so as to combine the desirable qualities of both materials, has been equally unavailing until this invention, although the art had long sought a means to combine the properties of these two materials.

It was well known how to prepare blends of natural rubber (cis-ionomer) or various synthetic rubbers with a variety of thermoplastic polymers. See for example, a survey of this technology in *NR TECHNOLOGY*, Quarterly Volume 9, Part 2, 1978 (published by the Malaysian Rubber Producers Research Association), beginning at page 21, Blends of a variety of rubber with polyolefins, including a very small percentage of an ionomer ("SURLYN") are described in U.S. Pat. No. 3,701,702. Although there is a general suggestion that any type of rubber can be used, including balata, none of the examples use balata, and especially none of the examples including the ionomer.

In accordance with the present invention, there is provided a composition comprising a homogeneous blend of from 10% to 90% by weight of a trans-isomer of poly(1,4-isoprene) in combination with from 90% to 10% by weight of an ionomer, and up to about 15% by weight of a cis-isomer of natural rubber, or synthetic rubber. Preferably, the blend contains from about 10% to about 50% by weight of the trans-isomer. The homogeneous blend of the present invention provides improved cut resistance compared to balata, and improved flight characteristics and back-spin capability, compared to the ionomer. When forming this homogeneous blend in accordance with the same techniques used for forming a golf ball cover from balata or from ionomer, a product is obtained which has the advantageous characteristics of the two materials, while the disadvantageous properties of each material alone is greatly reduced.

In accordance with the process of the present invention, the ionomer is mixed with a trans-isomer of poly(1,4-isoprene) in a fully enclosed, internal shear mixer, or masticator, under pressure and temperature sufficient to form a plastic mass; specifically, the mixing is carried out at a temperature of at least about 180° F., but not above the depolymerization temperature for the trans-poly(1,4-isoprene). Temperatures of greater than about 300° F. are unnecessary and tend to unduly degrade the final product. Preferably, the mixer is operated at a temperature in the range of from about 190° to about 250° F., and optimally, at a temperature of not greater than about 230° F.

Because of the relatively narrow range of operative temperatures, and particularly when operating at or just below the depolymerization temperature, it is important that the temperature be maintained as uniformly as possible throughout the mass being blended. This is achieved by providing heat exchange surfaces along the inner surface of the mixer as well as through the shear mixing blades. It has been found that there is sufficient heat generated during the mixing operation to raise the temperature to the desired range. Preferably, the interior surfaces of the mixer are pre-warmed to above about 120° F. before adding the rubber and ionomer, and preferably to above about 150° F. It is generally required to cool these surfaces during mixing to prevent overheating.

Suitable fully enclosed internal shear mixers are well-known to the art, and are sold under the names Banbury mixer, Intermix mixer or Bolling mixer. The pressure applied must be sufficient to compact the material added so as to insure complete mixing. Preferably, the minimum pressure applied to the plastic mass during mixing, which has the effect of decreasing the time required to fully blend the polymers and thus to prevent the degradation of either polymer, is at least about 25 psig, and preferably at least about 30 psig. The maximum pressure is limited primarily by the structural strength of the mixing device, but generally a pressure of greater than about 50 psig adds little or nothing to the effectiveness of the mixing operation.

The homogeneous mixture obtained can then be directly fed to a conventional roll mill and formed into sheets. Other conventional forming procedures can also be followed, such as extrusion or injection molding.

The mixing procedure should be carried out until a uniform blend is formed; the mixing should then be halted and the temperature permitted to decrease. Generally, rolling mills are conventionally operated, at temperatures in the range of from about 150° to about 170° F.

The trans-isomer of natural rubber, e.g., natural balata or gutta-percha, is generally found in nature as an aqueous latex comprising up to about 40% rubbery solids. The latex can be obtained from the sap of *mimusops globosa* or *Polaquium oblongifolium*, both of the sapotacae family, as balata or gutta-percha, respectively. Chicle also contains the trans-isomer, mixed with cis-isomer. It is known that the elastomer hydrocarbons obtained from these natural sources are trans-isomers of poly(1,4-isoprene). The preferred product used in forming the product of this invention is the purified hydrocarbon polymer coagulant obtained from the latex of these natural sources. Synthetic trans-isomers can also be used.

The synthetic ionomer polymer, commonly used for golf ball covers, is well-known in the art. The ionomer polymer is generally a copolymer of an alpha-olefin, having from about 2 to about 10 carbon atoms, and from 1 to about 25 mol percent of an alpha, beta-ethylenically unsaturated carboxylic acid having one or two carboxylic acid groups, and wherein at least about 10% of the carboxyl groups have been neutralized by at least one type of metal ion having an ionic valence of from 1 to 3, inclusive. Most commonly available are ionomers of ethylene and from about 3 to about 15% methacrylic acid or other carboxylic acid, and wherein about 10 to about 60% of the carboxylic acid groups are neutralized and ionized with zinc or sodium ions. Typical examples of these ionomer resins are as follows:

88% by weight ethylene/12% by weight methacrylic acid copolymer having 46% of the acid groups ionized with zinc ions, and containing 12% by weight zinc;

90% by weight ethylene 10% by weight methacrylic acid copolymer having 71% of the acid groups ionized with zinc ions, such that the resin contains 10% by weight zinc;

90% by weight ethylene/12% by weight methacrylic acid copolymer having 50% of the acid groups ionized with sodium ions, so that the resin contains 10% by weight sodium;

91% by weight ethylene/9% by weight methacrylic acid, having 18% of the acid groups ionized with zinc ions.

The various ionomer resins can be prepared according to the procedures set forth in U.S. Pat. No. 3,264,272, or Canadian Pat. No. 674,595. It is well-known that the physical properties of the ionomer resins vary with the chemical composition, to a certain extent, and that the proportion of carboxylic acid and the amount and type of metal ions present in the ionomer are especially effective in determining physical properties. These ionomers are thermoplastic resins, although believed to be ionically cross-linked.

Although the process of this invention is not contingent upon the understanding of the reaction mechanics, it is believed that some type of chemical reaction occurs between the available double bonds on the rubber polymer and the ionic bonds on the ionomer, at the narrow temperature range at which this process operates. It is for this reason that, it is believed, the product is self-curing, without requiring any of the curing agents normally required for rubbers. It is believed that "curing" occurs during the subsequent forming operations. The "curing" is not of the permanent type, because of the reversible nature of the ionic linkages, so that the blended product can be further shaped, e.g., molded, as desired. To the extent that linkages are formed between the polymer chains of the trans-isomer and polymer chains of the ionomer, it is believed that at each junction point at least three chains are connected.

If a more permanent, and conventional, curing of the trans-rubber polymer is desired, any of the conventional curing agents can be used, including those, e.g., containing sulfur, Tellurium, selenium, organic peroxides, or nitrated organic compounds.

It was also conventional practice, when, e.g., forming golf ball covers from balata, to add up to about 15% by weight of a cis-isomer of natural rubber, or a synthetic rubber. In the present invention, especially if the proportion of trans-rubber is greater than 50% by weight, the cis-natural rubber or synthetic rubber can be added in an amount up to about 15% by weight of the trans-isomer present.

Other compounding or modifying additives can be added to the blend of this invention, which optimally is a polymer blend consisting essentially of the ionomer and the trans-isomer of poly(1,4-isoprene) plus up to about 15% by weight, of the trans-isomer, of a cis-isomer of a natural rubber or synthetic rubber. The compounding or modifying additives include, for example, fillers, such as carbon black, clays, silica (hydrated), or whiting, other pigments, dyes, mold release agents, softeners, plasticizers, tackifying agents, or any curing agents. Such compounding can provide, e.g., the desirable "click" sound when a golf ball covered with this blend is struck by a club. An age resisting additive, i.e., an antioxidant, such as a bisphenol compound, can also be added.

Preferred examples of this invention, as presently known are set forth in the following examples. These examples are not set forth as exclusive of the present invention, but to exemplify the preferred aspects of the invention as known.

EXAMPLES 1-4

A copolymer of ethylene and methacrylic acid, neutralized by zinc ion, known as SURLYN 1557, was obtained from the DuPont Corporation. The SURLYN was a solid product having the following properties as obtained from the manufacturer:

(1) Vicat Softening point—158° F. (ASTM-D 1525)
(2) Flow Melt Index—5.0 gm/10 min (ASTM-D 1238)
(3) Specific Gravity—0.945 (ASTM-D 792)
(4) Tensile Strength at Yield—2.90×1000 psi (ASTM-D 638)
(5) Elongation at Yield—322 psi (ASTM-D 638)
(6) Flexural Strength at Yield—36.57×1000 psi (ASTM-D 790).

Natural Balata was obtained comprising almost 99% trans-1,4-polyisoprene and having the following properties:

Refractive Index—20° C.—1.55
Crystallization temperature of unstretched polymer—25° C.
Crystal melting temperature—65°–56° C.
Power factor, Ikc×sec$^1$, 250° C. (%)

| | | |
|---|---|---|
| Infrared Spectrum | Copper | 2.0 ppm |
| | Manganese | 0.5 ppm |
| | Iron | 2.5 ppm |
| | Lead | 2.2 ppm |
| | Arsenic | 0.5 ppm |
| | Zinc | 0.4 ppm |
| Specific Gravity | 0.9379 | |

Specific Gravity—0.9379

The Balata and the SURLYN were comminuted to a size not greater than 4 mesh; a feed batch containing 1.8 kgms. of the comminuted SURLYN and 0.2 kgms. of the comminuted Balata were fed to a laboratory Banbury mixer. The interior of the Banbury was pre-heated by live steam to a temperature of 150° F. To maintain high mixing efficiency, the hydraulic ram on the Banbury was applied to exert an internal pressure, in the Banbury, of about 40 PSI, during the entire mixing cycle. Mixing was continued, the mixer operating at a speed of about 70 RPM, for about 2.5 minutes until the ingredients were uniformly blended. The Banbury unit was monitored by checking the internal temperature, and the electric power consumption, as current drawn (amps). A continuous flow of cooling water through tubes in the perimeter walls and in the mixing blades was maintained. The temperature quickly reached 212° F., after shearing started, and was maintained at about that level. Uniform blending was signaled by a sharp downward change in the current (amps) drawn by the mixer. A temperature reading of the blended batch, taken by inserting a thermocouple prong into the material immediately upon opening the mixer, indicated a temperature of 280° F.

The blended batch was withdrawn from the mixer, and immediately passed to a conventional mill, having a roller nip to form a sheet 18 inches wide and 0.3 in. thick. The rolled sheet had a smooth and uniform surface appearance.

Portions of the sheeted product were then tested for Mooney viscosity and flow rate. The Mooney viscometer had a 1.5-inch rotor. A standard flow meter, having an orifice size of 0.0825±0.0002 in. I.D., 0.376 in. O.D., and 0.315±0.001 in. in length, was used to determine the flow rate. To determine the suitability of this material for its principal intended purpose, golf ball covers, the sheeted blend was comminuted into pieces 4 mesh in size. The cut slugs were immersed in water heated to 190° F. for 20-30 seconds, and the softened pieces pressed into half shell molds. An uncovered, wound golf ball core was placed in one hemispheric shell, and the two shells pre-heated at 200° F. for 2 minutes to remove moisture. The two shells were closed and pressed together at 300 PSI for 4 minutes, and then at 1,400 PSI for 2 minutes, maintaining the temperature of the mold at 200°-210° F. The mold was then chilled to 37° F. for 14 minutes while maintaining the high pressure. The mold was then opened. A golf ball having the desirable attributes of a Balata-covered ball was obtained. Upon testing, the ball was found to have greater cut-resistance than an all SURLYN golf ball and greater bounce and spin capability than a pure Balata ball.

The above procedure was repeated except that heating the Banbury mixer to temperatures of 195° F., 201° F. and 207° F. Similar results were obtained.

EXAMPLES 5-8

The procedure of Example 1 is repeated except that the proportions of Balata and the ionomer are varied as shown in the table below. Golf balls having the desirable characteristics are obtained.

| Example | Ionomer (parts by wt.) | Balata (parts by wt.) |
|---|---|---|
| 5 | 85 | 15 |
| 6 | 75 | 25 |
| 7 | 60 | 40 |
| 8 | 50 | 50 |

Samples of each of the blended batches from Examples 1-4 were tested by immersion in xylene, a solvent. After one month no noticeable swelling occurred or extraction of any trans-isomer, indicating stability to that solvent.

EXAMPLE 9 AND COMPARATIVE EXAMPLES

The procedure of Example 1 was followed to obtain a 50:50 mixture of SURLYN 1557 and natural balata, plus 0.5% by weight of the balata present of an antioxidant, CYANOX 2246 (sold by the American Cyanamid Co.), i.e., identified as 2,2'-methylene bis (4-methyl-6-tert.butyl phenol). As before, the internal pressure for the Banbury mixer was set by the application of the hydraulic ram and the internal temperature was monitored. The results of the runs are set forth in the following Table II, including the temperature to which the mixer interior had risen when mixing was stopped, the period of mixing and the appearance of the product. In all of the following examples, the only operating changes made by the operator was the pressure exerted by the hydraulic ram and the time of mixing.

TABLE II

| Example | Internal Temperature of Mixer | Pressure in Mixer | Time to Reach Temperature | Appearance of Product After Mixing |
|---|---|---|---|---|
| 9 | 190° F. | 30 | 1¼ min. | Smooth and shiny blend. |
| Comparative A | 180° F. | 10 | 6 min. | Some mixing, but very poor dispersion, discrete clusters of SURLYN remained. |
| Comparative B | No increase | 0 | 8 min. | No mixing, no temperature rise- Balata apparently depolymerized- becoming more fluid. |
| Comparative C | 190° F. | 20 | 4 min. | Better mixing but still somewhat rough. Some individual SURLYN pellets visible. |

As is clearly shown by the above chart, the application of internal pressure to the mixer is necessary in order to obtain the properly smooth and shiny blend of ionomer and the trans-isomer of natural rubber. Low pressures or a mixer exposed to the atmosphere does not properly mix prior to the time the polymers begin to degrade to a significant extent.

The patentable embodiments of this invention which are claimed are as follows:

1. A composition comprising an apparently homogeneous blend of from 10% to 90% by weight of trans-isomer of poly(1,4-isoprene) substantially free of depolymerized polymer, in combination with from 90% to 10% by weight of an ionomer that contains at least one mol percent of an ethylenically unsaturated carboxylic acid having one or two carboxylic acid groups, wherein at least about 10% of the carboxyl groups are neutralized by a metal having an ionic valence of from one to three, inclusive, and up to about 15% by weight of a cis-isomer of natural rubber or synthetic rubber.

2. The composition of claim 1 comprising from about 10% to about 50% by weight of the trans-isomer of poly(1,4-isoprene).

3. The composition of claim 1 wherein the ionomer is a copolymer of ethylene and methacrylic acid, wherein at least about 10% of the carboxyl groups have been neutralized by a metal ion selected from the group consisting of zinc and sodium.

4. The composition of claim 3 wherein the ionomer is formed from about 3 to about 15 mol percent methacrylic acid.

5. A process for forming a homogeneous, apparently stable blend of an ionomer that contains at least one mol percent of an ethylenically unsaturated carboxylic acid group, wherein at least about 10% of the carboxyl groups are neutralized by a metal having an ionic valence of from one to three, inclusive, and a trans-isomer and ionomer, in proportions of from 10% to 90% by weight trans-isomer and from 90% to 10% by weight ionomer, under conditions of pressure sufficiently greater than ambient to permit forming a uniform blend and at a temperature of at least about 180° F., but below the depolymerization temperature of the trans-isomer, until a uniform blend is obtained, which is substantially free from depolymerization of the trans-isomer.

6. The process of claim 5 wherein the trans-isomer and ionomer are mixed in a fully-enclosed masticator and at a temperature in the range of from about 190° to about 250° F.

7. The process of claim 6 wherein the internal surfaces of the masticator in contact with the mixture are subject to cooling by heat exchange.

8. The process of claim 7 wherein the internal surfaces of the masticator are pre-heated, prior to addition of the trans-isomer and ionomer, to a temperature of at least 150° F.

9. The process of claim 6 wherein the mixing is carried out at a temperature in the range of from about 200° to about 250° F. in the masticator.

10. The process of claim 7 wherein the mixing is by internal shear at a rate sufficient to at least maintain a temperature within the mixing batch of at least about 200° F.

11. The process of claim 5 wherein the internal pressure on the trans-isomer and ionomer during mixing is at least about 25 psig.

12. The process of claim 11 wherein the internal pressure is in the range of at least about 30 psig.

13. The composition of claim 1 wherein the ionomer is present in an amount of from about 50% to about 90% by weight.

14. The process of claim 5 wherein the ionomer is mixed in an amount from about 50% to about 90% by weight of the blend.

* * * * *